Sept. 6, 1938. A. A. CLEMENS 2,129,343
LOAD INDICATOR FOR MOTOR VEHICLES
Filed June 20, 1936 2 Sheets-Sheet 1

INVENTOR
*A.A.Clemens*
BY
ATTORNEY

Sept. 6, 1938.   A. A. CLEMENS   2,129,343
LOAD INDICATOR FOR MOTOR VEHICLES
Filed June 20, 1936   2 Sheets-Sheet 2
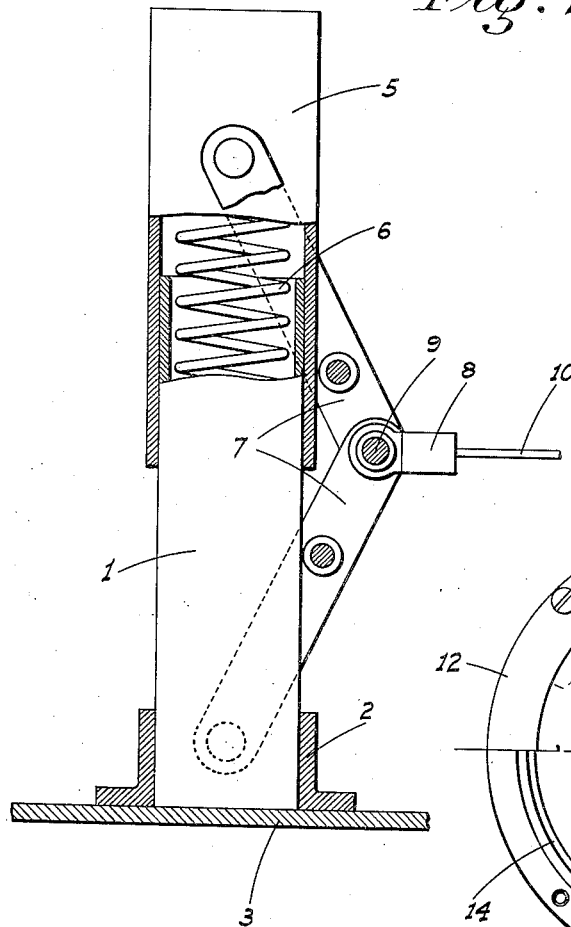
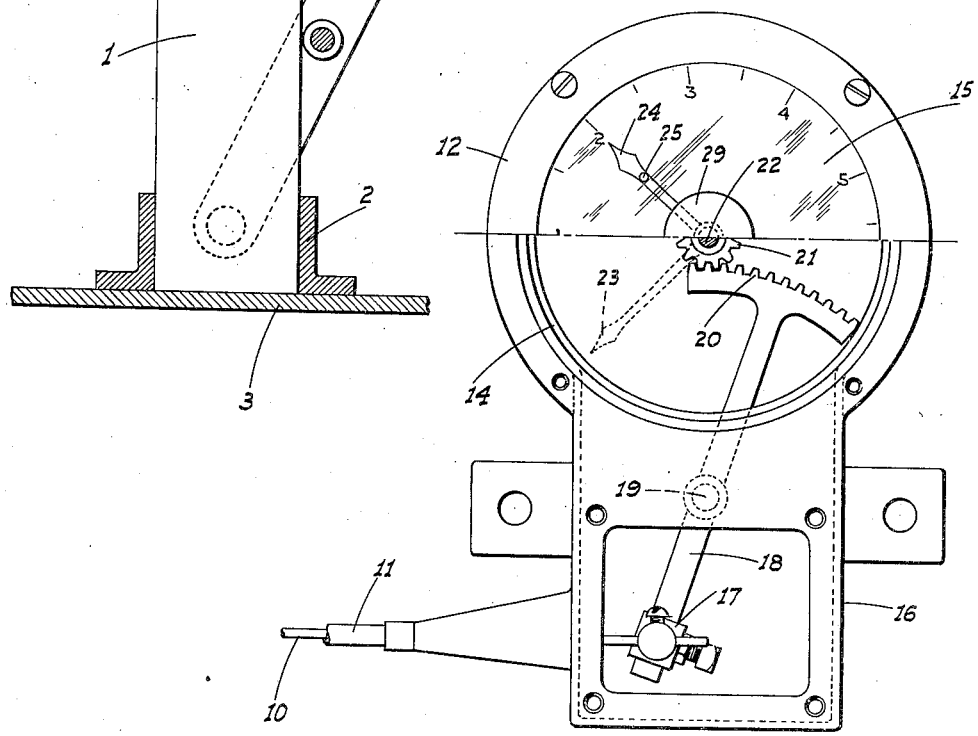
INVENTOR
*A. A. Clemens*
BY
ATTORNEY Patented Sept. 6, 1938

2,129,343

UNITED STATES PATENT OFFICE 2,129,343

LOAD INDICATOR FOR MOTOR VEHICLES

Alfred A. Clemens, Columbia, Calif.

Application June 20, 1936, Serial No. 86,308

2 Claims. (Cl. 265—42)

This invention relates generally to an indicating device for use in connection with motor vehicles, especially trucks, and in particular to a load indicating mechanism.

Modern traffic laws forbid the overloading of trucks which travel over the public roads and provide for maximum loads which any particular type or size of truck may carry.

It is therefore my principal object to provide a device for use in connection with trucks, which will indicate the weight of the load placed on the truck. By providing such device, it is not necessary that the truck be weighed on a platform scale each time it is loaded.

An additional object of my invention is to provide a load indicating device in which the operative mechanism thereof may be disengaged during the time the truck is in transit.

Another object of my invention is to provide means in conjunction with the indicator gauge which will indicate the total load which has been placed on the truck, even though the main indicating hand of the dial returns to zero when the mechanism is disengaged.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is an enlarged elevation partly in section of the toggle link unit.

Fig. 3 is an enlarged front elevation of the gauge.

Figure 1:
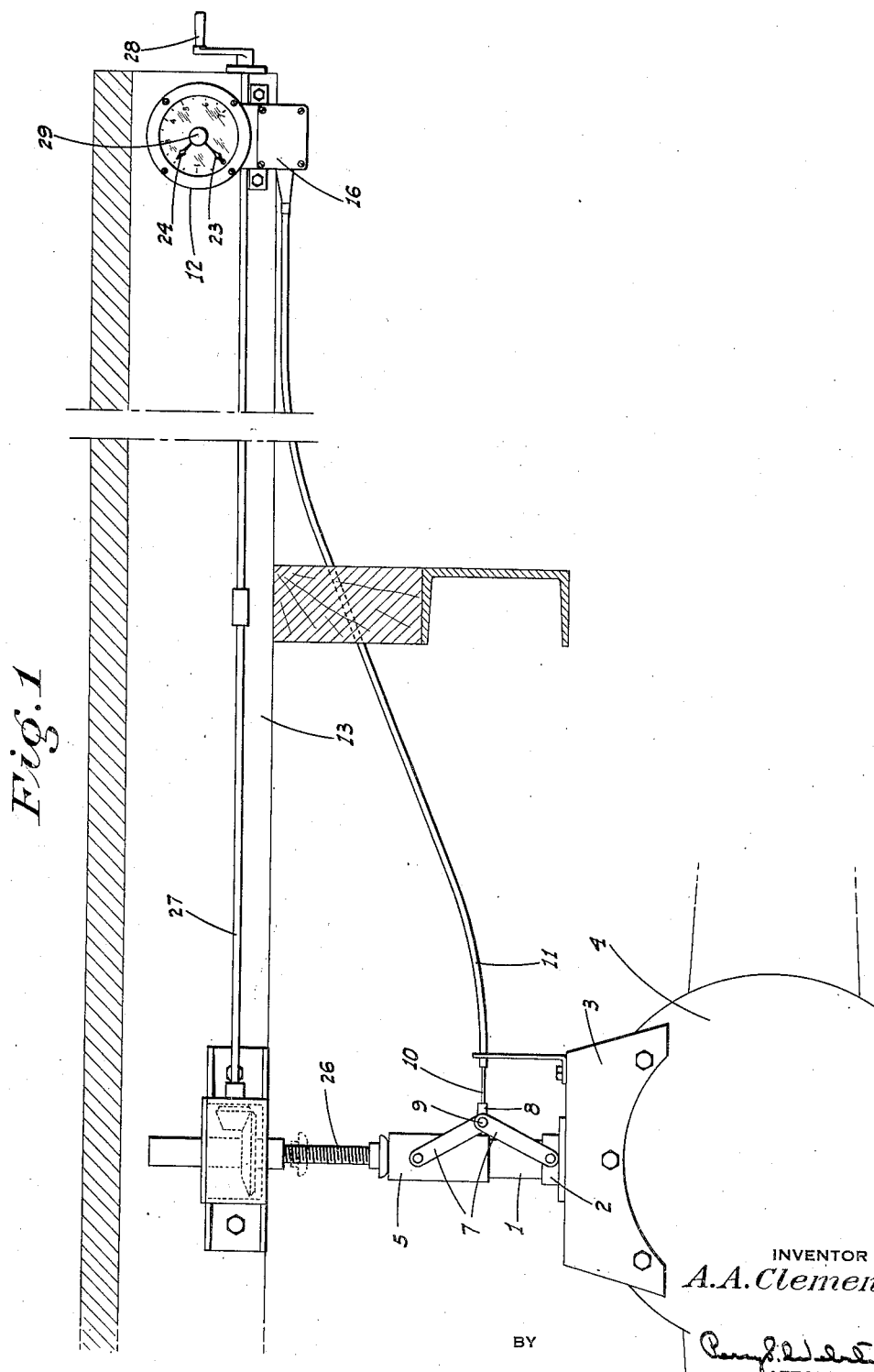
Fig. 1 is an elevation of the device as attached to a truck.

Referring now more particularly to the characters of reference on the drawings, the numeral 1 indicates a vertical tube fixedly secured to a base 2 which is mounted on a supporting member 3 attached to the differential housing 4 of a truck. A sleeve 5 slidably engages over tube 1 and is closed at its upper end. A compression spring 6 is disposed within the tube and sleeve and maintains the latter in a normally raised but depressible position.

A toggle link unit 7, having spaced upper and lower arms, is disposed with the upper arms pivoted at their outer ends on opposite sides of sleeve 5 and the lower arms pivoted at their outer ends on opposite side of base 2. A connection element 8 projects outwardly from the central pivot 9 of the toggle link unit.

A flexible spring steel wire 10, encased in a fixed flexible cable 11, is connected at one end to the element 8 on the toggle link unit and leads therefrom up to a connection with the operating mechanism of a gauge, indicated generally at 12, which is disposed on the bed 13 of the vehicle adjacent one side thereof and in a position convenient to view.

This gauge includes a circular case 14, a graduated dial 15 secured thereto and a housing 16 depending from the case. The flexible wire 10 extends into housing 16 on one side thereof and is connected to a coupling element 17 which is secured for sliding adjustment on the lower portion of an arm 18 pivoted intermediate its ends in the housing, as at 19.

The upper end of arm 18 projects into case 14 and is formed on said end with a segmental gear 20 which meshes with a pinion 21 turnable on a shaft 22 and to which pinion is attached an indicator hand 23 arranged to read on dial 15 of the gauge. Another hand 24, having an upstanding pin 25, is secured on the shaft 22 for rotation independent of the pinion and disposed behind hand 23. The purpose of hand 24 will hereinafter be described.

A downwardly depending jack screw 26 is mounted on the bed 13 of the truck above the sleeve 5 and in axial alinement therewith; whereby when rotated to a lowered position, the head of the jack screw will engage the top of the sleeve. This jack screw is connected with a horizontal operating shaft 27 which extends out to the side of the bed of the truck adjacent gauge 12. A crank-handle 28 is provided on the outer end of the shaft.

Operation

In use, my load indicating device operates as follows:

After the device is installed on a truck, a test is made to determine the amount of vertical deflection of the bed of the truck for a given weight placed thereon. The coupling element 17, which secures wire 10 to arm 18, is then adjusted to a position on the arm where, with a proportionate movement of wire 10, the indicator hand 23 will indicate the correct tonnage on dial 15. This operation must be carried out on each truck upon which the device is installed, due to the fact that the bed deflection of trucks varies when a given weight is placed thereon.

This adjustment having been once made, need not thereafter be altered on the same truck unless the truck springs become weakened with long service.

Before starting to load the truck, the screw 26 is lowered until it engages the top of sleeve 5. When the load is then placed on the truck and the bed 13 is lowered, the sleeve 5 will of course be lowered also. This will cause the toggle unit to be deflected, moving the central pivot 9 horizontally and pushing on wire 8. This will rotate gauge arm 18 and cause the indicator hand 23 to move about the dial from the initial zero position, and indicate the load received on the truck. At the same time, the hand 24 is also moved by engagement of pin 25 with hand 23, so that hand 24 also indicates the load.

When the truck has been loaded, the jack screw 26 is retracted from engagement with sleeve 5, so that during travel of the truck and with the deflection of the bed 13 due to road inequalities or shocks, no movement will be imparted to sleeve 5 and its associated parts.

Retraction of the jack screw from the sleeve allows the spring 6 to raise the sleeve to its normal position, which causes the gauge hand 23 to be returned to its initial zero position. At the same time, the secondary indicator hand 24 remains in the load indicating position.

If and when an additional load is to be placed on the truck, the jack screw is again advanced by hand until the sleeve 5 is lowered sufficiently to restore the hand 23 to its previous load indicating position, as determined by the position of hand 24. The further loading of the truck will then cause the sleeve 5 to be further depressed, and the hand 23 to move about the dial to indicate the total tonnage loaded on the truck. When this operation is completed, the jack screw is again retracted before travel is resumed.

After the load is discharged, the hand 24 is returned to a zero position by rotation of the knob 29 which is attached to the shaft 22 in front of dial 15.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a motor vehicle having a ground supported part and a bed above and movable downwardly relative thereto when a load is placed on the vehicle, a load indicating device comprising a load indicating gauge mounted on the bed, a member mounted on and upstanding from the ground supported part, another member slidably engaging the first member from above, a compression spring between the members, a toggle link unit connected at its ends on said members whereby downward movement of the other member will cause the central point of the link unit to move horizontally, a vertically adjustable screw mounted on the bed above the other member in position to engage and depress the same with the downward movement of the bed, a flexible element extending to the gauge from said central point of the link unit, the gauge including an indicating hand, and connecting means between the hand and element to move said hand with the longitudinal movement of the element.

2. In a motor vehicle having a ground supported part and a bed above and movable downwardly relative thereto when a load is placed on said bed, a load indicating device comprising a gauge mounted on the vehicle, a member mounted on and upstanding from the ground supported part, another member slidably engaging the first member from above, a compression spring between the members, a toggle link unit connected at its ends on said members whereby downward movement of the other member will cause the central point of the link unit to move away from said members, a vertically adjustable contact member mounted on the bed above the other member in position to engage and depress the same with downward movement of the bed, an actuating element extending to the gauge from said central point of the link unit, the gauge including an indicating hand, and connecting means between the hand and element to move said hand with actuation of the element.

ALFRED A. CLEMENS.